(12) United States Patent
Westberg (10) Patent No.: US 7,837,178 B2
(45) Date of Patent: Nov. 23, 2010

(54) COMPENSATING ANGLE OFFSET SAFETY WINCH BAR

(75) Inventor: Steven Westberg, Vancouver, WA (US)

(73) Assignee: The Westberg Group, LLC, Vancouver, WA (US)

(*) Notice: Subject to any disclaimer, the term of this patent is extended or adjusted under 35 U.S.C. 154(b) by 159 days.

(21) Appl. No.: 12/070,296

(22) Filed: Feb. 14, 2008

(65) Prior Publication Data

US 2009/0206306 A1 Aug. 20, 2009

(51) Int. Cl.
*B21F 9/00* (2006.01)

(52) U.S. Cl. .................. 254/243; 410/100; 410/103; 74/544; 74/545; 16/422; 16/436

(58) Field of Classification Search .................. 254/243, 254/237; 410/100, 103; 74/544, 545; 16/422, 16/436
See application file for complete search history.

(56) References Cited

U.S. PATENT DOCUMENTS

| | | | |
|---|---|---|---|
| 2,838,281 A | 6/1958 | Flippin |
| 4,873,742 A | 10/1989 | Dillon |
| D345,288 S | 3/1994 | Hubal et al. |
| 5,425,154 A | 6/1995 | Edwards, Jr. |
| 5,433,565 A | 7/1995 | Chan |
| 5,636,829 A | 6/1997 | Whiteman |
| 5,833,217 A | 11/1998 | Goldsby |
| D423,332 S | 4/2000 | Salter |
| D424,901 S | 5/2000 | Landry |
| 6,056,488 A | 5/2000 | Depoy |
| 6,092,437 A | 7/2000 | Sumner |
| 6,102,637 A | 8/2000 | Mocci |
| 6,196,092 B1 | 3/2001 | Potter |
| 6,308,596 B1 | 10/2001 | Williams |
| 6,398,470 B1 | 6/2002 | Mosley |
| 6,659,697 B1 | 12/2003 | Guenther |
| 6,824,339 B1 | 11/2004 | Childers |
| 6,848,872 B2 | 2/2005 | Perkins, Jr. |
| 6,854,939 B2 | 2/2005 | Im |
| 6,916,143 B2 | 7/2005 | Guenther |
| 7,017,847 B2 | 3/2006 | Treat |
| D526,173 S | 8/2006 | Hudson |
| 7,114,897 B1 | 10/2006 | Boydstun, IV et al. |
| 7,464,916 B1 * | 12/2008 | Drinkhorn ............. 254/243 |
| 2002/0074443 A1 | 6/2002 | Murdock et al. |
| 2006/0091368 A1 | 5/2006 | Im |
| 2006/0275095 A1 | 12/2006 | Boydstun, IV et al. |
| 2006/0275096 A1 | 12/2006 | Boydstun, IV et al. |
| 2007/0215848 A1 | 9/2007 | Gaudreault et al. |
| 2009/0206307 A1 | 8/2009 | Westberg |

* cited by examiner

*Primary Examiner*—Emmanuel M Marcelo
(74) *Attorney, Agent, or Firm*—Chernoff, Vilhauer, McClung & Stenzel, LLP (57) ABSTRACT

Applicant provides an offset safety winch bar to remove the handle portion of a winch bar from a hazard zone created by the offset angle of the winch bar for safety in winching strap spools attached to flatbed trailers. An offset safety winch bar includes a spool insert insertable into a flatbed trailer winch spool hole; a body connected to said spool insert; and a handle connected to said body, wherein said spool insert is at an offset angle from said body, and said body has one or more compensating angles to intersect a portion of said handle with the longitudinal axis of said spool insert. The compensating angles can place the longitudinal axis of said handle aligned upon the longitudinal axis of the spool insert.

8 Claims, 7 Drawing Sheets

COMPENSATING ANGLE OFFSET SAFETY WINCH BAR

FIELD OF THE INVENTION

The present invention relates to winch bars. More particularly, the present invention relates to winch bars for flat bed trailer winch spools.

BACKGROUND

Flatbed trailers are trailers of various sizes, lengths, widths, and load capabilities, used to transport materials of various types from one location to another, both on and off roadways, highways, within the state and/or from one state to another, or to another country. Standard winch bars, which have a spool insert I, body B, and a gripping handle G, see FIG. 2, are used in correlation with a Winch W mounted to a Flatbed Trailer F, see FIG. 1B. A standard winch bar, FIG. 2, is typically a steel bar approximately 31-40" in length. One end has a tapered tip approximately 3½" to 4" in length. This tip angles from the center of the Winch bar approximately 140 degrees to 170 degrees, depending on the manufacturer.

Figure 1A:
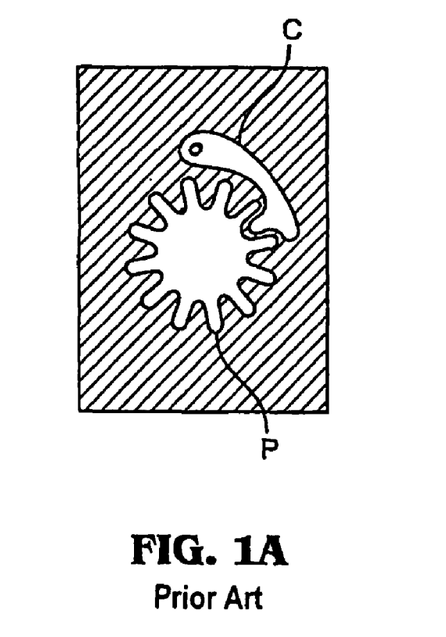
FIGS. 1A and 1B shows the winch to which the present invention is applied
Figure 1B:
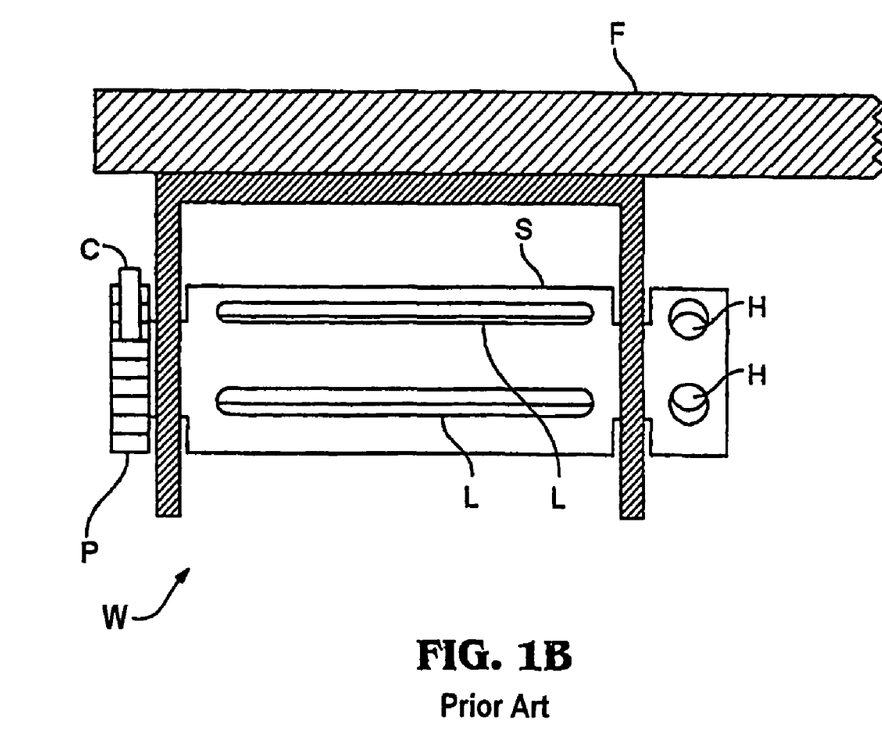
Figure 2:
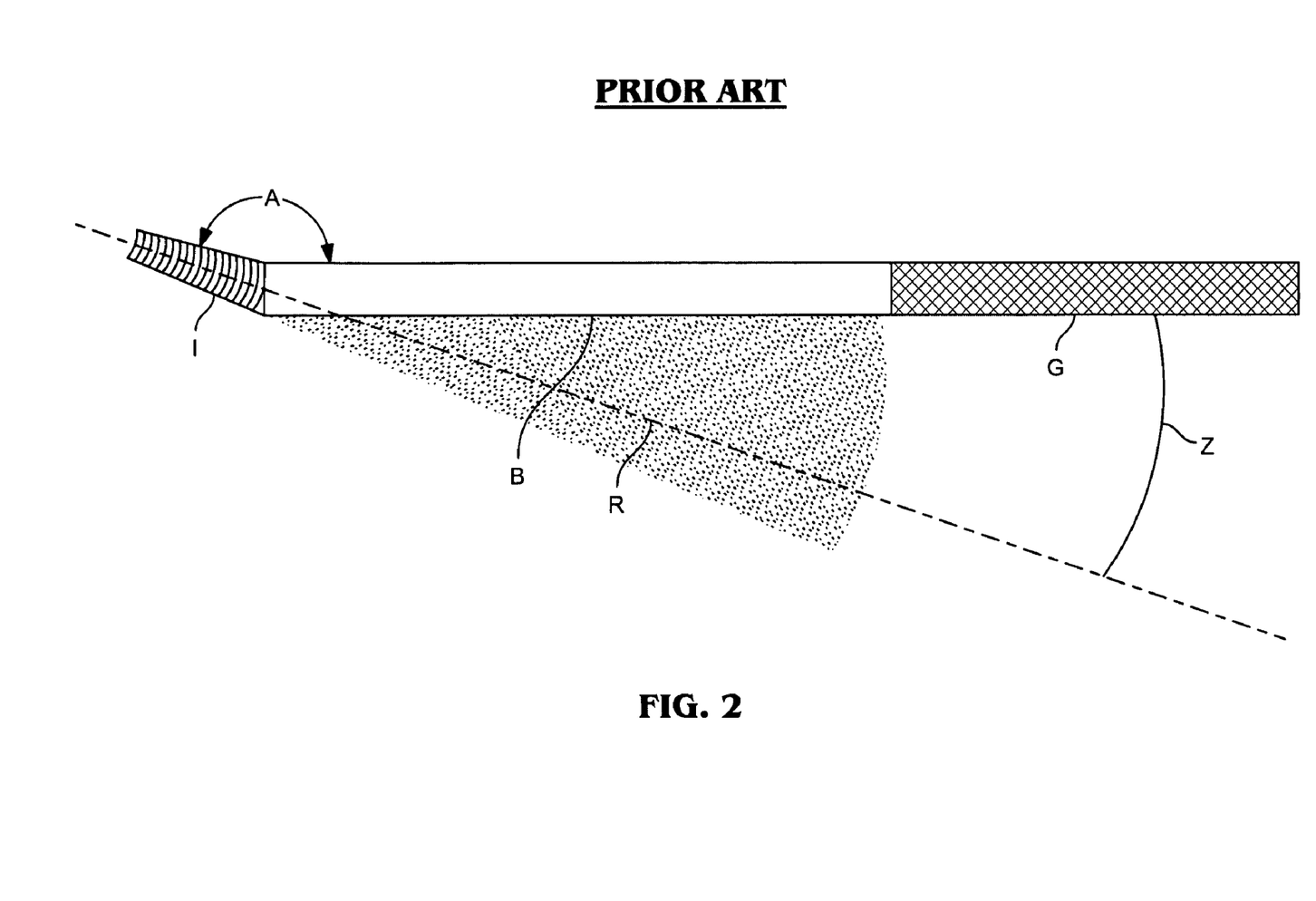
FIG. 2 shows a prior art winch bar.

A strap is thrown over an item(s) loaded on the trailer, hooked to one side of the trailer with the other end laced through the Strap Slots, L, on the Winch W Spool S, see FIG. 1B. The Spool S has a spool sprocket P on one end, the center portion which contains the strap slots L, and the "Winch Bar Insertion Holes" H portion on the opposite end of the spool from the spool sprocket P. The spool insert I of the winch bar is then inserted into the insertion holes H, FIG. 1B, and turned in a downward rotation, winding the strap around the Spool S and tightening the strap against the loaded item(s) on the trailer F. The insertion holes H are fashioned so the winch bar, when inserted into these holes for tightening or loosening, is perpendicular to the spool and in line with the spool's rotation. The Spool Sprocket P and Sprocket Catch C, shown in FIG. 1A, allow the Spool S to be tightened with more pressure being applied in a downward motion by the winch bar and not unwinding during the process. The spool sprocket P is a thin wheel with teeth lining the outside diameter. It is a part of the Spool S, and can be located on either the left or right end. The Sprocket Catch C prevents undesired unwinding.

The spool insert longitudinal axis R is the axis line running longitudinally through center of the spool insert I and which is orthogonal to the spool S axis of rotation.

On existing winch bars an offset angle A, FIG. 2 is placed just behind the Spool Insert I. This offset allows the winch bar to be used in two basic positions, angle up and angle down. This allows the winch bar to clear obstacles such as tires, trailer, fenders and side mounted trailer boxes. In order for the strap to be tightened on the Spool for securing the load, the Spool must be able to be turned a quarter rotation for the winch bar to reach the next insertion hole for further tightening. Often, due to these obstacles, the bar cannot do so without rotating it from the angle down to the angle up position in the same hole, or vise versa.

Angle A is an offset angle on any winch bar which creates an obstruction clearance area for the winch bar to clear an obstruction in order to tighten the strap around the spool with less the ¼ of a turn. It takes ¼ turn of the winch spool for the winch bar to reach the next insertion hole. This can be done by rotating the winch bar from the angle down position to the angle up, and vise versa. The range for this angle can be from 140 to 170 degrees. Any other variation of degrees would tend to make a winch bar impractical.

Existing winch bars have several hazard zones. The first Hazard Zone Z, FIG. 2, which is the most prominent area of concern, is the "angle up" position as the winch bar is shown. There is a high center of gravity. If there is any misalignment of the winch bar with the downward pressure, to one side or the other, the bar will race down in a pivoting action, and an uncontrolled spiral rotation of the winch bar will occur. This often causes the operator to fall quickly towards the ground, potentially hitting the upper body including the face, against the trailer, winch bar, fender of the trailer, and even the ground. Many other parts of the body could sustain injury as in the back, neck, abdomen, knees, etc.

The next Hazardous area is the tip of the Spool Insert I. Although typically the winch bar has ridges going around this tip, sometimes they do not provide adequate holding tension for the winch bar to remain inserted in the winch bar insertion hole H. This can cause the bar to slip out when enough downward pressure is applied, thereby causing the operator to fall towards the ground, potentially striking various portions of their body against the winch bar, trailer, fender, etc. Substantial injury is likely to be caused.

The third Hazardous area is the Handle Slope. This is the downward slope of the handle portion of the Winch Bar when placed in the most commonly used position, angle down. As the operator applies downward pressure, they tend to be pushing their grip towards the end of the Handle instead of perpendicular to it. This has a tendency of causing the grip to slip, and the operator to fall towards the bar, trailer, and ground, thereby sustaining some type of injury.

Thus, there is a need for a winch bar that addresses these hazard zone disadvantages, and which reduce the disadvantages created by these hazard zones. A number of devices have provided winch bars or winch bar like devices, but have not solved the problems created by these disadvantages. The following represents a list of known related art:

| Reference: | Issued to: | Date of Issue: |
|---|---|---|
| U.S. patent application 2007/0,215,848 | Gaudreault et al | Pub'd Sep. 20, 2007 |
| U.S. patent application 2006/0,275,095 | Boydstun, IV et al | Pub'd Dec. 7, 2006 |
| U.S. patent application 2006/0,091,368 | Im | Pub'd May 4, 2006 |
| U.S. patent application 2002/0,074,443 | Murdock et al. | Pub'd Jun. 20, 2002 |
| U.S. patent application 2006/0,275,096 | Boydstun, IV et al. | Pub'd Dec. 7, 2006 |
| U.S. Pat. No. 7,114,897 | Boydstun, IV et al. | Oct. 3, 2006 |
| U.S. Pat. No. 7,017,847 | Treat | Mar. 28, 2006 |
| U.S. Pat. No. 6,916,143 | Guenther | Jul. 12, 2005 |
| U.S. Pat. No. 6,854,939 | Im | Feb. 15, 2005 |
| U.S. Pat. No. 6,848,872 | Perkins, Jr. | Feb. 1, 2005 |
| U.S. Pat. No. 6,824,339 | Childers | Nov. 30, 2004 |
| U.S. Pat. No. 6,659,697 | Guenther | Dec. 9, 2003 |
| U.S. Pat. No. 6,398,470 | Mosley | Jun. 4, 2002 |
| U.S. Pat. No. 6,102,637 | Mocci | Aug. 15, 2000 |
| U.S. Pat. No. 6,092,437 | Sumner | Jul. 25, 2000 |
| U.S. Pat. No. 6,056,488 | Depoy | May 2, 2000 |
| U.S. Pat. No. 5,636,829 | Whiteman | Jun. 10, 1997 |
| U.S. Pat. No. 5,433,565 | Chan | Jul. 18, 1995 |
| U.S. Pat. No. 5,425,154 | Edwards, Jr. | Jun. 20, 1995 |
| U.S. Pat. No. 4,873,742 | Dillon | Oct. 17, 1989 |
| U.S. Pat. No. 2,838,281 | Flippin | June 1958 |
| U.S. Des. Pat. D526,173 | Hudson | Aug. 8, 2006. |
| U.S. Des. Pat. D424,901 | Landry | May 16, 2000. |
| U.S. Des. Pat. D423,332 | Salter | Apr. 25, 2000. |
| U.S. Des. Pat. D345,288 | Hubal et al. | Mar. 22, 1994. |

The teachings of each of the above-listed citations (which does not itself incorporate essential material by reference) are herein incorporated by reference. None of the above inventions and patents, taken either singularly or in combination, is seen to describe the instant invention as claimed.

U.S. Patent Application No. 2007/0215848 by Gaudreault et al published Sep. 20, 2007 for a Leverage tool for tightening devices discloses a tightening device leverage tool includes a bar member with a bar axis; a first receiver mounted to the bar member, and a second receiver mounted to the bar member and spaced-apart along the bar axis from the first receiver. The first and the second receivers are simultaneously engageable with a respective one of a first ratchet buckle member and a second ratchet buckle member, spaced apart from one another, for pivoting at least one of the first and the second ratchet buckle members about a pivot axis.

U.S. Patent Application No. 2006/0275095 by Boydstun, IV et al published Dec. 7, 2006 for a Vehicle support and retention system for a vehicle transporter discloses a cargo retaining winch includes a rotationally secured winch shaft that is substantially longer than the width of a flexible member to be wound on the winch to secure cargo. The flexible member can be wound in one of a continuity of locations along the longitudinal axis of the winch shaft to improve alignment of the flexible member and the cargo.

U.S. Patent Application No. 2006/0275096 to Boydstun, IV et al published Dec. 7, 2006 for a Vehicle support and retention system for a vehicle transporter discloses a vehicle support and restraint system for a vehicle transporter permits the operator to consistently and securely install either soft tie-down or hard tie-down cargo vehicle restraint while standing at ground level.

U.S. Patent Application No. 2006/0091368 by Im published May 4, 2006 for Winch bars discloses a winch bar has an insertion portion adapted to fit in openings of a winch drum of non-circular cross-section, whereby the winch bar cannot rotate relative to the openings to present hazards of injury to persons or property which can result with prior art circular drum openings and circular cross-section bars.

U.S. Patent Application No. 2002/0074443 by Murdock et al. published Jun. 20, 2002 for a Strap winding device discloses a strap winding device for quickly and effectively winding the strap about the spindle. The strap winding device includes a bracket member having a main wall and end walls being spaced apart and extending outwardly of the main wall; and also includes a spindle being rotatably mounted to the bracket member and being adapted to carry a strap; and further includes a knob member being attached to the spindle and having a plurality holes extending therethrough; and also includes a crank assembly being removably connected to the knob member for turning the spindle to roll up and unroll the strap.

U.S. Pat. No. 7,114,897 to Boydstun, IV, et al. issued Oct. 3, 2006 for a Vehicle support and retention system for a vehicle transporter discloses a vehicle support and restraint system for a vehicle transporter permits the operator to consistently and securely install either soft tie-down or hard tie-down cargo vehicle restraint while standing at ground level.

U.S. Pat. No. 7,017,847 to Treat issued Mar. 28, 2006 for a Cargo strap winding apparatus discloses a winding apparatus (winder) that is used to quickly and conveniently wind cargo straps into individual coils for storage from conventional strap winches is disclosed. The winder has a two piece design, which includes a "jawbone" shaped cantilever and a removable crank. The "jawbone" configuration of the cantilever is created by its toothed tapered sides at its front and the pair of spaced parallel ears at its rear. The removable crank can be fitted to the cantilever in a winding position inserted between the two ears or in a storage position secured within the front section of the cantilever. The cantilever is mounted to the strap winch in a plurality of positions to ensure that the rear of the cantilever extends beyond the edge of the trailer bed providing easy access to the crank in its winding position. One end of a cargo strap is secured to the crank, which is fitted to the cantilever and the crank is manually turned to wind the cargo straps into a coil.

U.S. Pat. No. 6,916,143 to Guenther issued Jul. 12, 2005 for a Speed handle for winch discloses a speed handle for use in combination with a strap winch on a flat bed trailer. The straps used to secure loads on trailers can be 30 to 40 feet in length. There is no good way to wind these straps onto their winch when they are not in use. Currently the job is done by hand which is very slow and tedious. The speed handle engages a lug of the winch and allows the strap to be wound back onto the winch very quickly. The speed handle allows the winding to occur with only one hand so that another hand is free to guide the strap onto the winch drum.

U.S. Pat. No. 6,854,939 to Im issued Feb. 15, 2005 for a Winch bar discloses a winch bar has an insertion portion adapted to fit in openings of a winch drum of non-circular cross-section, typically square or hexagonal, whereby the winch bar cannot rotate relative to the openings to present hazards of injury to persons or property which can result with prior art circular drum openings and circular cross-section bars.

U.S. Pat. No. 6,848,872 to Perkins, Jr. issued Feb. 1, 2005 for a Load strap winding device discloses a device for quickly winding strap around a spool of a ratcheting binder assembly having a longitudinal axis includes a leverage hole engaging mechanism, a longitudinal axis generally coincident with the longitudinal axis of the spool, and two generally freely rotatable handles offset from the longitudinal axis spaced 180 degrees apart. An alternate embodiment includes an extended tail end portion adapted to rest within an adjacent ratcheting binder and may include another leverage hole engaging mechanism to turn two adjacent spools coincidently.

U.S. Pat. No. 6,824,339 to Childers issued Nov. 30, 2004 for a Belt winch speed handle discloses a handle for speed winding a strap back onto a belt winch having a ratchet mechanism, a winch drum and an annular cylinder is described. The speed handle generally includes an elongated arm having a grip on the upper surface adjacent the first end and a handle drum on the lower surface adjacent the second end. The handle drum includes a tapered end and is adapted to fit into the annular cylinder of a belt winch. The handler drum includes a protrusion with a tapered end, adapted to fit into an aperture on the annular cylinder. Once placed on the belt winch, the speed handle allows the user to rapidly rewind a strap back onto the winch drum.

U.S. Pat. No. 6,659,697 to Guenther issued Dec. 9, 2003 for a Winch bar discloses a winch bar is provided for use in combination with a strap winding winch for flat bed trailers. The winch bar has two stable positions of engagement with the strap winch. The winch bar will reduce accidents commonly caused by slippage of the winch bar relative to the winch during application of high torque.

U.S. Pat. No. 6,398,470 to Mosley issued Jun. 4, 2002 for a Strap winding tool discloses a strap winding tool includes a bent metal bar with a short elbow which can fit into a borehole opening in a ratchet extension on a strap winder on a flat bed trailer.

U.S. Pat. No. 6,102,637 to Mocci issued Aug. 15, 2000 for a Flatbed winch winding bar discloses a winding tool for a winch is disclosed. The winch is used on flatbed trailers to hold webbing used to strap down loads on the trailer. The winding tool is designed to use the winch bar interface on currently available winches.

U.S. Pat. No. 6,092,437 to Sumner issued Jul. 25, 2000 for a Winch bar discloses a winch bar is adapted at each end for use with ratcheting winches on truck trailer beds to respectively wind and tighten tie straps for securing cargo on the truck bed. The winch bar is provided with a hooked end member and a handle portion at one end to assist in the rapid winding of a strap secured to the ratcheting winch member. At the other end, the winch bar is provided with an angled end member which may be tapered so as to securely engage the winch member for tightening the strap. The handle portion may be used to provide leverage when tightening the strap.

U.S. Pat. No. 6,056,488 to Depoy issued May 2, 2000 for a Locking winch bar discloses a locking winch bar having a locking mechanism for securing the winch bar in a winch sprocket so that the bar does not accidentally exit the sprocket. The winch bar has an elongated shaft with a grasping end and a tapering bend at the other end. The shaft includes a groove located at the tapering bend, and within the groove is position a locking mechanism. The locking mechanism includes a lock member having a pawl element at one end and a trigger at the other end. The other end of the lock member is pivotally secured within the groove by a pivot pin, and a spring member is positioned within the groove to act upon the lock member by biasing it outwardly, from the groove. A retaining member secured to the shaft across the groove limits the outward extent of the lock member. Upon pressing the trigger, the lock member is forced into the groove against the action of the spring member, which thereby causes the pawl element to become recessed within the groove.

U.S. Pat. No. 5,636,829 to Whiteman issued Jun. 10, 1997 for an Extendible cheater bar discloses an extendible cheater bar for use in tightening the ratchet mechanisms and consequently the straps used in long haul trucking applications for the securement of loads. The extendible cheater bar includes a second body member and a first body member. The second body member is hollow, elongated and includes an internal cavity with an internal surface which is partially or wholly internally threaded. The first body member is elongated and has an outer surface which is partially or wholly externally threaded. The first body member screws into and out of the internal cavity of the second body member, thereby forming an extendible and retractable cheater bar lever with improved characteristics while maintaining the necessary rigidity.

U.S. Pat. No. 5,433,565 to Chan issued Jul. 18, 1995 for a Winch bar discloses there is a winch bar for winding a winch having a winding drum with an annular wall and a circular opening. A plurality of winch bar receiving apertures extend diametrically through the drum on opposite sides of the wall. The winch bar has an outer portion dimensioned to extend through the apertures. The winch bar also has an inner portion larger than the apertures and a first shoulder between the inner portion and the outer portion. The outer portion includes an outer tip which tapers outwardly. There is a first segment of reduced section adjacent the tip and dimensioned to receive the wall of the drum on the first side thereof. A second shoulder is located between the tip and the first segment. There is a second segment of reduced section adjacent the first shoulder and which is dimensioned to receive the wall of the drum on a second side thereof. The bar has a third segment having a larger section than the first and second segments and which is located therebetween. The third segment is dimensioned to fit within the central opening of the drum between the first and second sides of the annular wall.

U.S. Pat. No. 5,425,154, Edwards, Jr. issued Jun. 20, 1995 for a Trucker's leverage bar and method discloses an improved leverage bar for use on a load binder handle or in the opening of a ratcheting binder comprising a bar having a latch assembly on a first end for engaging the load binder. The latch assembly comprises a generally U-shaped wall member with a latch member and a fulcrum member interposed therebetween. A second end of the bar comprises a rod assembly for engaging the opening of a ratcheting binder. The rod assembly comprises a first cylindrical section secured to a second cylindrical section which is smaller in diameter to the first cylindrical section and an conical end cap member secured to the second cylindrical section. A method for operating a ratcheting binder and a load binder, all such as those installed on a flat-bed trailer.

U.S. Pat. No. 4,873,742 to Dillon issued Oct. 17, 1989 for a Safety tie down bar hand grip system discloses a safety tie down bar is provided with a handle grip and a protection system for use with a ratcheting winch type tightening device. The safety tie down bar includes a longitudinally extended handle member having a linearly directed section and an angularly directed section. Each of sections and includes a ratchet end portion and respectively. Hand grip and protection system includes a plurality of annular sleeves longitudinally displaced each from the other along handle member. First annular sleeve functions alternately as either a hand grip member, when ratchet end portion is inserted within the ratcheting device, or as a means for limiting the insertion depth of ratchet end portion. Similarly ratchet stop member is located adjacent the ratchet end portion for either acting as a hand grip member when ratchet end portion is inserted within the tightening device, or serving as a means for limiting the insertion depth of ratchet end portion. Both first annular sleeve and ratchet stop member provide a protective resilient cover for portions of handle member likely to be subjected to notching. Additionally, a resilient end cap member is provided to be releasably coupled to either end of handle member to provide a cushion for the exposed end of handle member when the opposing end is inserted within the ratchet type tightening device.

U.S. Pat. No. 2,838,281 to Flippin for an Automobile Carrier Winch issued June 1958, which is directed to a winch, shows winch bar with an offset angle with no compensating angles and with a locking piece which mates to lock with a corresponding section in the in the winch spool insertion holes.

U.S. Des. Pat. No. D526,173 to Hudson issued Aug. 8, 2006 shows a Strap rolling apparatus.

U.S. Des. Pat. No. D424,901 to Landry issued May 16, 2000 shows a Belt wench crank.

U.S. Des. Pat. No. D423,332 to Salter issued Apr. 25, 2000 shows a Tie-down belt rewind crank.

U.S. Des. Pat. No. D345,288 to Hubal et al. issued Mar. 22, 1994 shows a Crank for use with semi-trailers.

Still other features would be desirable in a winch bar with an offset angle. For example, one or more compensating angles which place a portion of the handle of a winch bar within the longitudinal axis of the spool insert. Thus, while the foregoing body of art indicates it to be well known to have a winch bar, the art described above does not teach or suggest an offset safety winch bar which has the following combination of desirable features: (1) reducing the tendency of the winch bar to want to twist and spiral down because of a possible misalignment of the bar; (2) hand pressure is made to be closer to perpendicular to the winch bar; (3) allowing the operator to place one hand in this area where the most leverage can be obtained; (4) reducing the risk of the winch bar twisting uncontrollably; (5) allowing the winch bar to increase a number of inches on the bar position regarding its relation to the height from the ground to help in leverage so that the operator does not have to bend over as far to move the winch to a position that tightens the strap on the load; (6) moving a portion of the handle into an area of the spool insert longitudinal axis to reduce or eliminate the conical rotation hazard; and, among others, (7) providing a handle alignment that helps reduce the slope of the handle, aiding in the overall grip of the winch bar.

SUMMARY AND ADVANTAGES

Applicant provides an offset safety winch bar to remove the handle portion of a winch bar from a hazard zone created by the offset angle of the winch bar for safety in winching strap spools attached to flatbed trailers. An offset safety winch bar includes a spool insert insertable into a flatbed trailer winch spool hole; a body connected to said spool insert; and a handle connected to said body, wherein said spool insert is at an offset angle from said body, and said body has one or more compensating angles to intersect a portion of said handle with the longitudinal axis of said spool insert. The compensating angles can place the longitudinal axis of said handle in line with the longitudinal axis of the spool insert.

The offset safety winch bar of the present invention presents numerous advantages, including: (1) reducing the tendency of the winch bar to want to twist and spiral down because of a possible misalignment of the bar; (2) hand pressure is made to be closer to perpendicular to the winch bar; (3) allowing the operator to place one hand in this area where the most leverage can be obtained; (4) reducing the risk of the winch bar twisting uncontrollably; (5) allowing the winch bar to increase a number of inches on the bar position regarding its relation to the height from the ground to help in leverage so that the operator does not have to bend over as far to move the winch to a position that tightens the strap on the load; (6) moving a portion of the handle into an area of the spool insert longitudinal axis to reduce or eliminate the conical rotation hazard; and, among others, (7) providing a handle alignment that helps reduce the slope of the handle, aiding in the overall grip of the winch bar.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Applicant provides embodiments of an offset safety winch bar to remove the handle portion of a winch bar from a hazard zone Z, shown in FIG. 2, for safety in winching strap spools attached to flatbed trailers. As shown in FIGS. 1-4, 6-7, an offset safety winch bar 10, with alternative embodiments 20, 30, 40, 50, 60, 70, or 80, respectively, includes a spool insert 12, or 22, 32, 42, 52, 62, 72, or 82 respectively, insertable into a flatbed trailer F winch W spool S holes H; a body 14, or 24, 34, 44, 54, 64, 74, or 84, respectively, connected to said spool insert 12; and a handle 16, or 26, 36, 46, 56, 66, 76, or 86, respectively, connected to said body 14, wherein said spool insert 12 is at an offset angle A from said body, and said body has one or more compensating angles B, C, and D, to intersect a portion of said handle 16 with the longitudinal axis R of said spool insert 12. The compensating angles B, C, and D can place the longitudinal axis of said handle 36, 46, 56, 66, or 76 in line with the longitudinal axis R of the spool insert. The offset safety winch bar may vary in length from 2' to 4', depending on the needed application. However, its standard length will be 31" to 40".

Figure 3A:
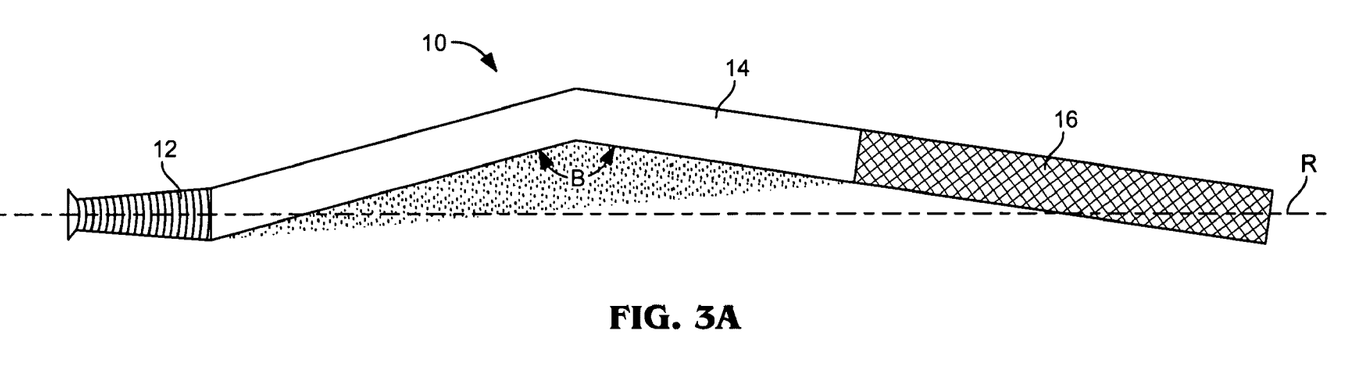
FIG. 3A shows an embodiment of the present invention with a single compensating angle.
Figure 3B:
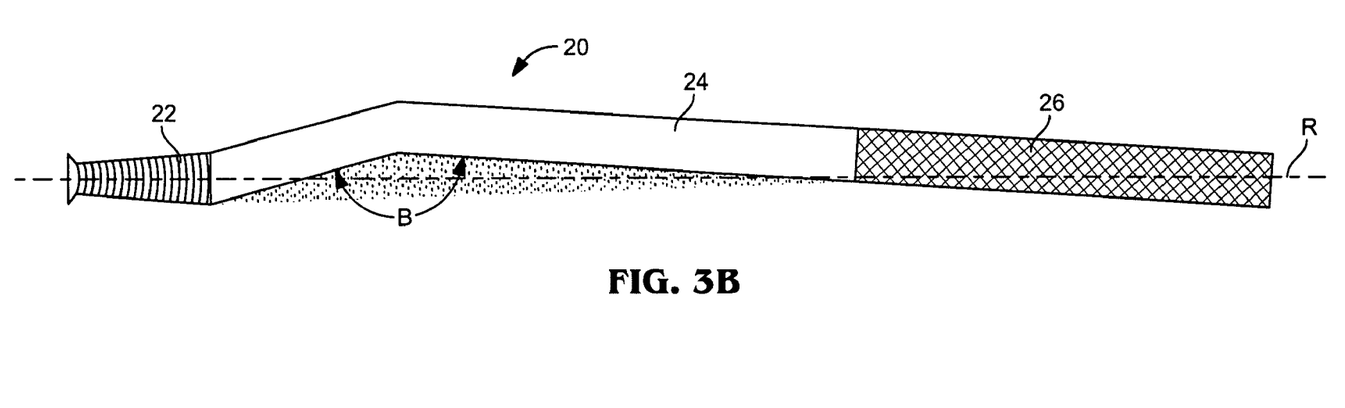
FIG. 3B shows another embodiment of the present invention with a single compensating angle.
Figure 7:
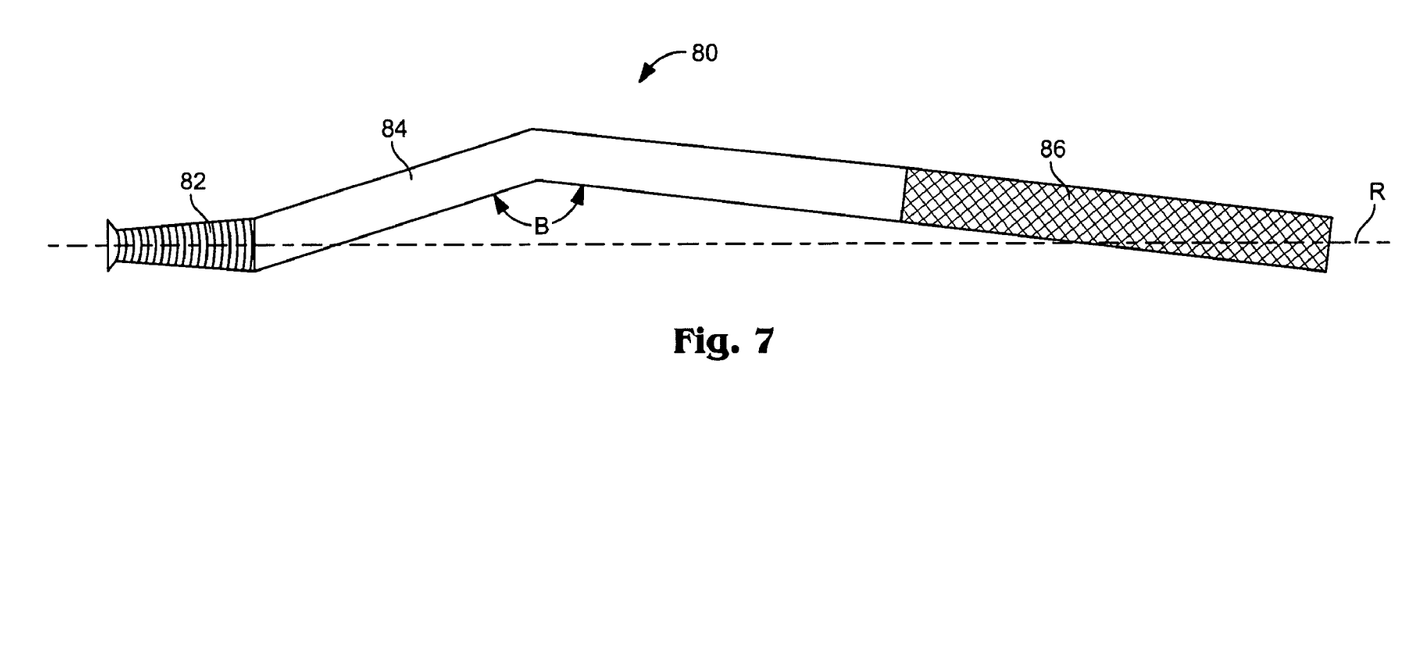
FIG. 7 shows another embodiment of the present invention with a compensating angle.

FIGS. 3A, 3B, and 7 show embodiments with a single compensating angle B, where compensating angle B compensates for the offset angle A to intersect a portion of the handle 16, 26, or 86, with the longitudinal axis R of the spool insert 12, or 22, or 82. Where angle B is the only compensating angle, it compensates angle A such that a portion of the handle 16, 26, or 86 intersects with the longitudinal axis R of the spool insert, with angle B an obtuse angle directly related to the length of the body 14, 24, or 84 and the handle 16, 26, or 86.

Figure 4A:
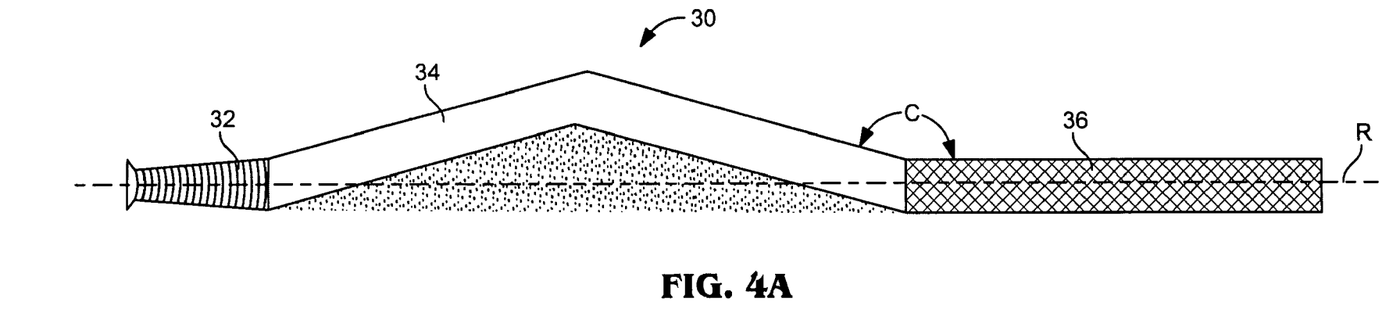
FIG. 4A shows an embodiment of the present invention with two compensating angles.
Figure 4B:
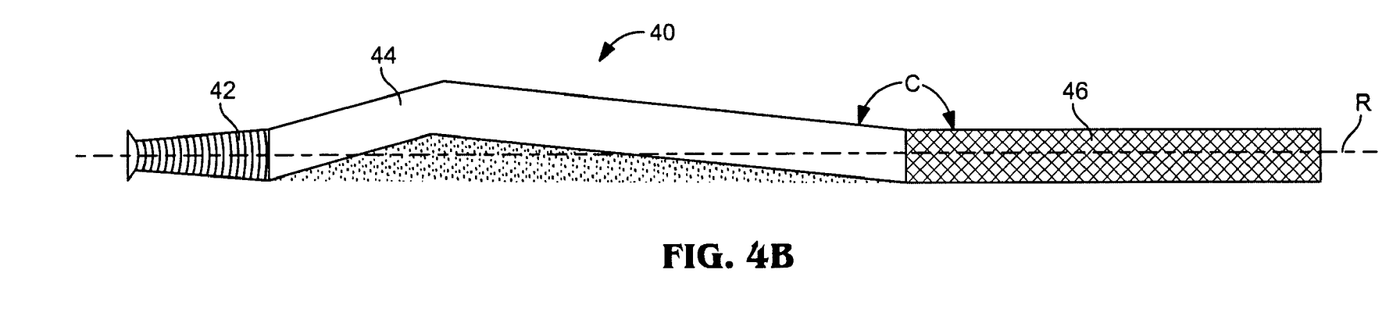
FIG. 4B shows another embodiment of the present invention with two compensating angles.
Figure 4C:
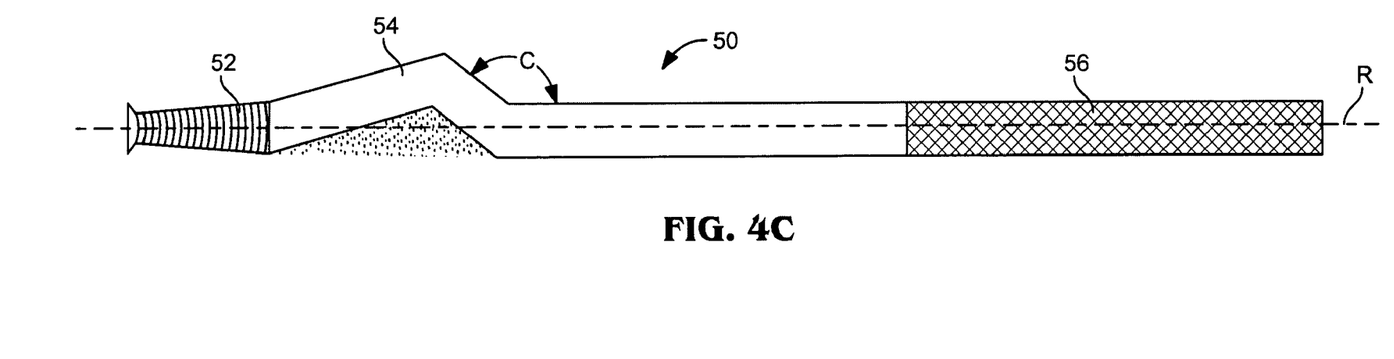
FIG. 4C shows another embodiment of the present invention with two compensating angles.

FIGS. 4A, 4B, and 4C show embodiments with two compensating angles, B and C, where compensating angle B opposes offset angle A, and compensating angle C, opposes compensating angle B to align the longitudinal axis of the handle 36, 46, or 56, with the longitudinal axis R of the spool insert 32, 42, or 52. Angle C is an obtuse angle placed in front of the handle along the bar so as to align the longitudinal axis of the handle 36, 46, or 56, with the longitudinal axis R of the spool insert 32, 42, or 52. Angle B and Angle C are thus directly related to offset Angle A and put the longitudinal axis of the handle 36, 46, or 56, in an aligned position with respect to the longitudinal axis R of the spool insert 32, 42, or 52.

Figure 6A:
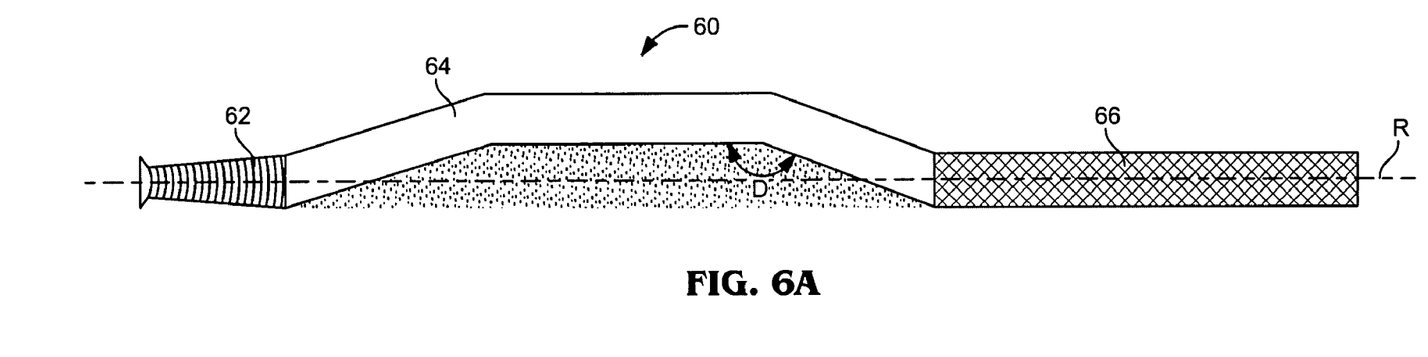
FIG. 6A shows an embodiment of the present invention with three compensating angles.
Figure 6B:
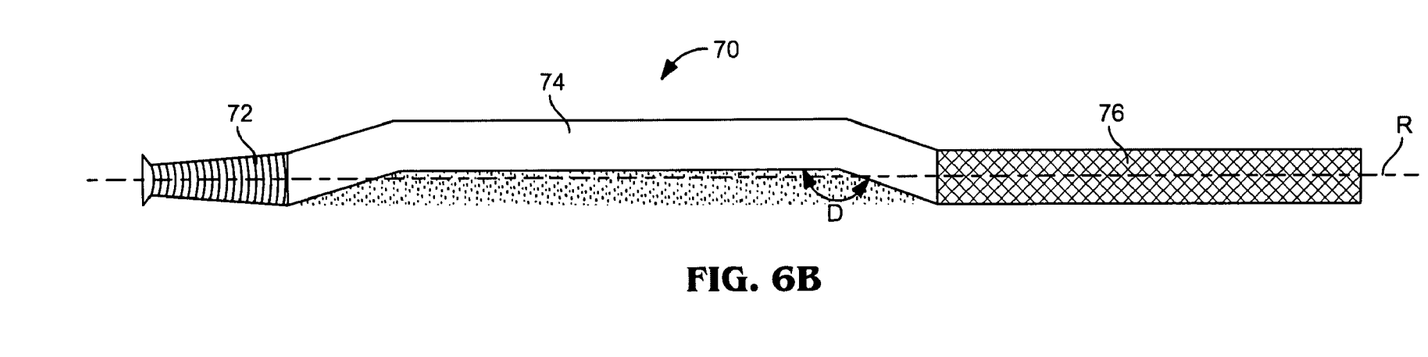
FIG. 6B shows another embodiment of the present invention with three compensating angles.

FIGS. 6A and 6B show embodiments with three compensating angles, B, C, and D, where compensating angle B opposes offset angle A, to render a portion of said body 60 or 70, parallel to the longitudinal axis R of the spool insert, 62 or 72, compensating angle C opposes compensating angle B to direct portion of said body 60 or 70 toward the longitudinal axis R of the spool insert, 62 or 72, and compensating angle D, an obtuse angle, opposes compensating angle C to align the longitudinal axis of the handle 66 or 76, with the longitudinal axis R of the spool insert 62 or 72.

Figure 5:
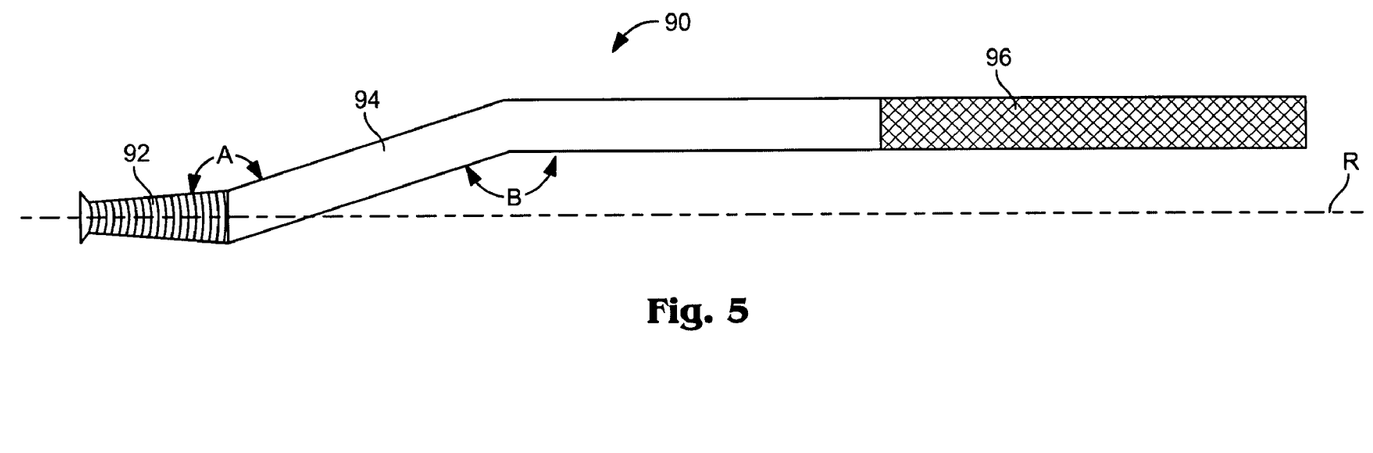
FIG. 5 shows another embodiment of the present invention with a compensating angle which is complementary to the offset angle.

FIG. 5 shows yet another embodiment 90 of an offset safety winch bar to remove the handle portion of a winch bar from a hazard zone created by the offset angle of the winch bar for safety in winching strap spools attached to flatbed trailers, and which includes a spool insert 92 insertable into a flatbed trailer F winch spool hole H, a body 94 connected to said spool insert 92, and a handle connected to said body, having the said spool insert 92 at an offset angle A from said body 94, and said body 94 having compensating angle B to said offset angle A to align said handle 96 parallel to the longitudinal axis R of said spool insert 92. For this embodiment 90, compensating angle B is an angle geometrically complementary to angle A.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An offset safety winch bar to remove a handle portion of a winch bar from a hazard zone created by the offset angle of the winch bar for safety in winching strap spools attached to flatbed trailers, comprising:
    a spool insert insertable into a flatbed trailer winch spool hole;
    a body connected to said spool insert; and
    a handle connected to said body,
    wherein said spool insert is at an offset angle from said body, and said body has two compensating angles to cause a portion of said handle to be parallel with the longitudinal axis of said spool insert.

2. An offset safety winch bar to remove a handle portion of a winch bar from a hazard zone created by the offset angle of the winch bar for safety in winching strap spools attached to flatbed trailers, comprising:
    a spool insert insertable into a flatbed trailer winch spool hole;
    a body connected to said spool insert; and
    a handle connected to said body,
    wherein said spool insert is at an offset angle from said body, and said body has three compensating angles to cause a portion of said handle to be parallel with the longitudinal axis of said spool insert.

3. A winch bar for use in tightening a strap on a winch spool attached to a flatbed trailer to secure a load, comprising:
    a spool insert insertable into a flatbed trailer winch spool hole;
    a body connected to said spool insert; and
    a handle connected to said body,
    wherein said spool insert is at an offset angle from said body, said body has at least two compensating angles, and a longitudinal axis of said handle is aligned with a longitudinal axis of said spool insert.

4. The winch bar of claim 3, wherein there are three compensating angles.

5. A winch bar for use in turning a spool of a strap winch attached to a flatbed trailer to secure a load, comprising:
    a spool insert having a longitudinal axis and that is insertable into a flatbed trailer winch spool hole;
    an elongate body connected to and extending longitudinally from said spool insert; and
    a handle connected to said body at a location spaced apart from said spool insert,
    wherein said spool insert is oriented at an offset angle from said body, and wherein said body includes a compensating angle that is complementary to said offset angle and that aligns said handle parallel to the longitudinal axis of said spool insert.

6. A winch bar for use in tightening a load retaining strap on a winch spool attached to a flatbed trailer, comprising:
    a spool insert having a longitudinal axis, the spool insert being insertable into a flatbed trailer winch spool hole;
    an elongate body connected to and extending longitudinally from said spool insert; and
    a handle connected to said body and spaced apart from said spool insert, said longitudinal axis of said spool insert being oriented at an offset angle with respect to said body and said body including at least one compensating angle, whereby a portion of said handle intersects an extension of said longitudinal axis of said spool insert.

7. A winch bar for use in tightening a load retaining strap on a winch spool attached to a flatbed trailer, comprising:
    a spool insert having a longitudinal axis, the spool insert being insertable into a flatbed trailer winch spool hole;
    an elongate body connected to and extending longitudinally from said spool insert; and
    a handle connected to said body and spaced apart from said spool insert, said longitudinal axis of said spool insert being oriented at an offset angle with respect to said body and said body including two compensating angles, so that a portion of said handle is parallel with an extension of said longitudinal axis of said spool insert.

8. The offset safety winch bar of claim 7 wherein there are three compensating angles.

* * * * *